(12) United States Patent
Semmel et al.

(10) Patent No.: US 9,062,806 B2
(45) Date of Patent: Jun. 23, 2015

(54) COUPLING ELEMENT AND UNLOCKING ELEMENT FOR THE COUPLING ELEMENT

(71) Applicant: NORMA GERMANY GMBH, Maintal (DE)

(72) Inventors: Patrick Semmel, Linsengericht (DE); Viktor Stoll, Grosskrotzenburg (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 13/740,855

(22) Filed: Jan. 14, 2013

(65) Prior Publication Data

US 2013/0181437 A1 Jul. 18, 2013

(30) Foreign Application Priority Data

Jan. 16, 2012 (DE) .......................... 10 2012 000 607

(51) Int. Cl.
*F16L 41/00* (2006.01)
*F16L 55/00* (2006.01)
*F16L 37/084* (2006.01)

(52) U.S. Cl.
CPC ............. *F16L 55/00* (2013.01); *F16L 37/0847* (2013.01)

(58) Field of Classification Search
USPC ...................... 285/308, 39, 82, 319
See application file for complete search history.

(56) References Cited

U.S. PATENT DOCUMENTS

| | | | |
|---|---|---|---|
| 4,596,272 A * | 6/1986 | Medvick et al. ......... | 137/614.03 |
| 5,378,025 A * | 1/1995 | Szabo .............................. | 285/39 |
| 5,443,289 A * | 8/1995 | Guest .............................. | 285/39 |
| 6,173,998 B1 | 1/2001 | Bock | |
| 2005/0029810 A1* | 2/2005 | Dong ............................. | 285/308 |
| 2012/0119485 A1* | 5/2012 | Cichorek et al. ................ | 285/81 |

FOREIGN PATENT DOCUMENTS

| | | |
|---|---|---|
| DE | 195 15 967 | 11/1997 |
| DE | 198 31 897 | 1/2000 |
| JP | 10-082491 | 3/1998 |
| JP | 2000-065273 | 3/2000 |
| JP | 2012-087927 | 5/2012 |

(Continued)

OTHER PUBLICATIONS

German Office Action conducted in counterpart German Appln. No. 10 2012 000 607.1 (May 2, 2012) (with English language translation).
Japan Office action conducted in counterpart Japan Appln. No. 2012-284865 (Nov. 12, 2013)(w/ English lanugage translation).
German Office Action conducted in counterpart German Patent Appln. No. 10 2012 000 607.1 (May 26, 2014).

(Continued)

*Primary Examiner* — Aaron Dunwoody
(74) *Attorney, Agent, or Firm* — Greenblum & Bernstein P.L.C.

(57) ABSTRACT

Coupling element for a fluid line, an unlocking element, and a method of engaging and/or disengaging the coupling element with an insertion element. The coupling element includes a housing having a receptacle region structured and arranged to receive an insertion element, and a snap-in locking device in the receptacle region that is structured and arranged for a locking connection with the insertion element. The snap-in locking device includes at least one locking element having an unlocking lever and an unlocking element is movable between a first position, in which the unlocking element interacts with the unlocking lever, and a second position, in which the unlocking element releases the unlocking lever.

19 Claims, 2 Drawing Sheets

(56) References Cited

FOREIGN PATENT DOCUMENTS

| KR | 10-2000-0011771 | | 2/2000 |
| WO | 2011-006591 | | 1/2011 |
| WO | WO 2011006591 | A1 * | 1/2011 |

OTHER PUBLICATIONS

Korean Office action conducted in counterpart Korean Appln. No. 10-2013-0005025 (Mar. 21, 2014) (w/ English language translation).
China Office Action conducted in counterpart China Patent Appln. No. 201310014496.3 (Mar. 19, 2015)(w/ English transdatIon).

* cited by examiner

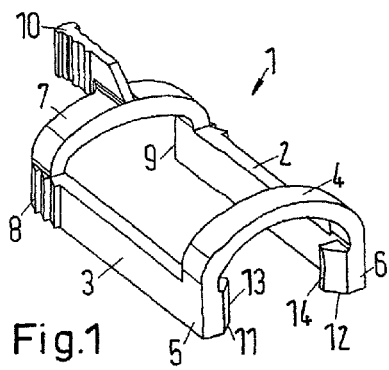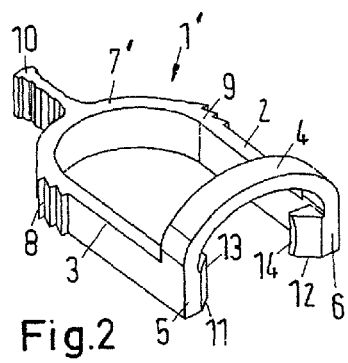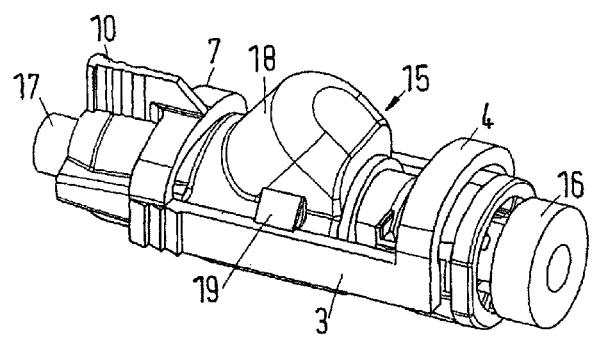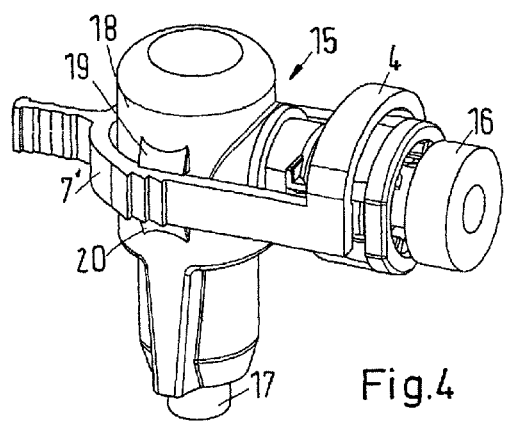

COUPLING ELEMENT AND UNLOCKING ELEMENT FOR THE COUPLING ELEMENT

CROSS-REFERENCE TO RELATED APPLICATIONS

The present application claims priority under 35 U.S.C. §119(a) of German Patent Application No. 10 2012 000 607.1 filed Jan. 16, 2012, the disclosure of which is expressly incorporated by reference herein in its entirety.

BACKGROUND OF THE INVENTION

1. Field of the Invention

Embodiments of the invention relate to a coupling element for a fluid line having a housing that has a receptacle region for receiving an insertion element. The receptacle region has a snap-in locking device for a locking connection with the insertion element, the snap-in device including at least one locking element that has an unlocking lever.

Embodiments of the invention further relate to an unlocking element for a coupling element of this type.

2. Discussion of Background Information

Coupling elements of this type are used to connect fluid lines to nozzles, which for example are connected to a fuel tank. They can also be used to connect two lines for example in a vehicle. For example, a fluid-tight connection of so-called urea lines takes place via the coupling element.

The line to be connected using the coupling element has an insertion element that can be inserted into the seating region. The insertion element has a snap-in locking geometry, such as for example a circumferential flange which can interact with the snap-in locking device that is disposed in the receptacle region. The insertion element can thus be locked within the coupling element such that a secure connection is guaranteed.

To loosen the snap-in locking device, the locking element is provided with an unlocking lever; the locking element releases the insertion element upon actuation of the unlocking lever.

Coupling elements are often used in constricted spaces, for example in the automotive sector. For this reason, it is often relatively difficult to activate the unlocking lever. Loosening the coupling element becomes consequently complex.

SUMMARY OF THE EMBODIMENTS

Embodiments of the invention enable a simple loosening of the snap-in locking device.

This problem is inventively solved using a coupling element of the type described at the beginning, in that an unlocking element can be moved between a first position, in which it interacts with the unlocking lever, and a second position, in which the unlocking element releases the unlocking lever.

The unlocking levers of the locking device no longer need to be directly actuated, but rather are indirectly actuated by the unlocking element. The required actuating force is transferred via the movement of the unlocking element. In this manner, a transmission of force also results.

It is particularly preferable in this case that the unlocking element is mounted to be linearly displaceable. A linear displacement movement can be produced relatively easily, for example, by pulling or pushing on the unlocking element. Simultaneously, the unlocking element can be mounted relatively free of play, which is advantageous if the coupling element is exposed to vibrations.

The unlocking lever is preferably designed as one piece with the locking element. The locking element and the unlocking lever can be made of, for example, plastic. A one-piece design is thus relatively easily possible. The one-piece design also results in a very direct transmission of forces without additional connection points, which could be susceptible to dirt and/or temperatures.

The snap-in locking device has preferably at least two locking elements that are disposed on a circular path. The locking element can be moved radially outward by pressing the unlocking lever radially inward. In the case of two locking elements, these are disposed preferably on diametrically opposite sides of the housing of the coupling element. It is relatively easy to exert a compression force on the unlocking levers, in that, for example, the unlocking element is moved over an exterior side of the unlocking lever. In order that the locking element is then moved radially outward, the combination of the unlocking lever and locking element are mounted pivotably. A materially-bonded articulation is thus provided that is formed, for example, by the elasticity of the materials used and can be designed as one piece with the unlocking lever and the locking element.

The unlocking element preferably has a number of members disposed in parallel that correspond to the number of locking elements. The members each have an effective surface for interacting with one of the unlocking levers. A traction or compression force, which effects a displacement of the unlocking elements, can be applied relatively far removed from the snap-in locking device via the members. The members can also form relatively long guide surfaces for the unlocking element such that a relatively stable and in particular rattle-free mounting of the unlocking element is possible on the housing of the coupling element.

The effective surfaces are preferably disposed on projections directed radially inwardly that are in particular designed at the ends of the members. The effective surfaces can be spaced at a distance from the members due to the projections.

In this way, the effective surfaces can interact relatively easily with the unlocking levers. The projections increase a force directed radially inward, which affects the unlocking levers via the effective surfaces and thus affects an opening of the snap-in locking device. By simple displacement of the unlocking element, the effective surfaces can be brought in to cover with the unlocking levers and, due to the projections, automatically exert a force directed radially inward onto the unlocking levers, which thus effect an opening of the snap-in locking device.

The members are preferably connected to each other at the ends on which the projections are designed. The connection is, if necessary, designed in an arch-like shape, the curve of which runs in particular parallel to a curve of the housing in the receptacle region. The connection prevents the members from bending upwards, when the members transfer a force directed radially inward to the unlocking levers. In this manner, a relatively large force can be transferred without deforming the unlocking element. Due to an arch-shaped configuration of the connection, the curve of which runs parallel to a curve of the housing in the receptacle region, the connection runs so to speak along an exterior side of the housing, such that not much additional installation space is required. The coupling element can thus remain slim.

In a preferred embodiment, the members are connected to each other via a second connection at the second ends facing away from the projections. This second connection effects a stiffening of the unlocking element. It simultaneously ensures that all members are moved uniformly, such that all locking elements are simultaneously actuated.

The second connection preferably has an operation handle which is disposed in particular in the middle between the members. With the assistance of the operation handle, the handling is simplified. The operation handle can be designed for example in such a way that operation with gloves is easily possible.

The second connection preferably runs parallel to the first connection. The second connection is thus likewise designed as curved with a curve that runs parallel to the housing of the coupling element. A space-saving arrangement of the unlocking element at the housing of the coupling element is thus possible.

In another preferred embodiment, the second connection runs in a plane with the members and has in particular a curve that is directed away from the first ends. An embodiment of the unlocking element of this type lends itself in particular to coupling elements that are bent at 90°, in which the unlocking element has in particular only two members. The curve of the second connection can then likewise be adjusted to the housing of the coupling element, such that only a little additional installation space is required.

The members are displaceably guided in particular axially at the coupling element, for example, laterally outside on the housing of the coupling element. With regard to an embodiment of the unlocking element with two members, these members can be guided diametrically opposite with each respectively on one side of the housing of the coupling element. The coupling element can for example have a guide for this which is formed by two protrusions respectively for each member. It is also conceivable to provide a groove in which the members are guided.

More preferably, the locking elements can be displaced axially between a blocking position, in which a movement of the unlocking lever is blocked, and an unengaged position, in which the unlocking levers can be actuated. In this way, a blocking of an actuation of the unlocking levers is possible and thus an undesired opening of the snap-in locking device can be prevented. For example, it can be ensured thereby that the unlocking levers are positioned above raised points by the axial movement of the locking elements, so that the raised points prevent a compression of the unlocking levers.

It is thereby particularly preferred that the projections of the unlocking element interact with projections on the locking elements in such a way that, by applying a tractive force on the unlocking element, the locking elements can be moved from the blocking position into the unengaged position. With the assistance of the unlocking element, the unlocking levers are then actuatable, and the locking elements can be displaced from the blocking position into an unengaged position.

It is particularly preferred that, upon application of the tractive force, the projections of the unlocking element can slide over the projections of the locking elements, such that the effective surfaces interact with the unlocking levers. By a simple pulling movement, which is applied to the unlocking element, the locking elements can then be initially moved from the blocking position into the unengaged position, and then subsequently the unlocking levers are automatically actuated, such that the snap-in locking device opens. The increase of the tractive force results then automatically in this case in that the locking elements are prevented from a further movement upon reaching the unengaged position, in that for example the locking elements hit a stopper.

A serrated surface is provided preferably at the second ends of the members and/or on the handle. In this manner, the application of a tractive force on the unlocking elements is simplified in particular during damp conditions or during operation with gloves.

Preferably, the locking elements can be moved into the blocking position by pulling on the insertion element after the locking elements lock with the insertion element. This application of a tractive movement between the insertion element and the coupling element thus initially serves to move the locking elements into the blocking position, and thus to prevent loosening. Simultaneously, this also ensures that the insertion element is securely held in the snap-in locking device, thus it was properly guided into the receptacle region. In the case of an improper connection, the insertion element would otherwise be released again by the application of the tractive force.

In this way, an assembly indicator is preferably provided, which, after displacing the locking elements into the blocking position, can be displaced into a position that signals a secure connection. Simultaneously, the assembly indicator can then prevent a sliding back of the locking elements. The assembly indicator must then initially be removed or at least moved before the locking elements can be moved into the unengaged position. For example, for this purpose, the assembly indicator is moveable into a space which is released by moving the locking elements from the unengaged position into the blocking position.

Embodiments of the invention are directed to an unlocking element that includes at least two members disposed in parallel that are connected to each other at the respective ends thereof by a connection. The unlocking element is used to unlock a snap-in locking device of the above-described coupling element. The above-noted embodiments of the coupling element apply correspondingly.

The number of members disposed in parallel can, for example, correspond to a number of locking elements of the coupling element. In this manner, it is possible to assign a member to each locking element and thus guarantee a simultaneous actuation of all locking elements. Projections directed radially inward having effective surfaces can be provided on ends of the members. By the effective surfaces, a force directed radially inward is then exerted on the locking elements, which are opened thereby. In the region of the projections, the members can be connected to each other. This connection can be designed in an arch-like shape or in a curve that runs parallel to a curve of the housing in the receptacle region. The connection prevents a radial bending upward of the members. Simultaneously, the unlocking element can be adapted relatively well to the shape of the coupling element due to the curved design of the connection. In this manner, only a little additional installation space is required for the coupling element.

At a second end of the members, which end faces away from the projections, the members can likewise be connected via a connection. This second connection can run parallel to the first connection or have a curve that runs perpendicular to the curve of the first connection. By this means, an adaptation of the shape of the unlocking element to the shape of the coupling element is possible.

The unlocking element thus simplifies an unlocking of the coupling element and thus a removal of an insertion element connected to the coupling element. An unlocking is also possible without problems in constricted installation spaces, because, for example, the locking elements no longer have to be reached by hand, but instead can be actuated via the unlocking element. The locking elements are thus indirectly unlocked via the unlocking element. The point, which must be manually engaged, is extended by the unlocking element, specifically into a region that is more easily accessible than the region in which the locking elements are disposed. The insertion region of the coupling element is thus expanded, in particular in constricted installation conditions. Expected assembly work, for example in the case that a replacement due to repairs is necessary, is thereby shortened by the unlocking element.

Embodiments of the invention are directed to a coupling element for a fluid line. The coupling element includes a housing having a receptacle region structured and arranged to receive an insertion element, and a snap-in locking device in the receptacle region that is structured and arranged for a locking connection with the insertion element. The snap-in locking device includes at least one locking element having an unlocking lever and an unlocking element is movable between a first position, in which the unlocking element interacts with the unlocking lever, and a second position, in which the unlocking element releases the unlocking lever.

According to embodiments, the unlocking lever can be structured as one piece with the locking element.

In accordance with other embodiments, the snap-in locking device may have at least two locking elements that are disposed on a circular path, and the locking element can be movable radially outward by pressing the unlocking lever radially inward. The unlocking element may have a number of members, corresponding to a number of locking elements, which are disposed in parallel and have effective surfaces. The effective surfaces can be disposed on projections directed radially inward that are located at ends of the members. Further, a first connection may couple the ends of the members with the projections to each other. The first connection can have an arched shape with a curve corresponding to a curve of the housing in the receptacle region. A second connection can couple the members to each other at second ends of the members opposite the ends with the projections. The second connection may run parallel to the first connection. Further, the second connection can run in a plane with the members and can have a curve that is directed away from the ends with the projections.

According to further embodiments, the locking elements can be axially positionable between a blocked position, in which a movement of the unlocking levers can be blocked, and an unengaged position, in which the unlocking levers may be actuatable. The projections of the unlocking element can interact with projections on the locking elements so that in applying a traction force on the unlocking element, the locking elements can be movable from the blocking position into the unengaged position. Further, by increasing the traction force, the projections of the unlocking element can slide over the projections of the locking elements so that the effective surfaces interact with the unlocking levers. The locking elements can be movable into the blocked position by pulling on the insertion element after locking with the unlocking element.

Moreover, in embodiments are directed to an unlocking element to unlock a snap-in locking device of the above-described coupling element. The unlocking element includes at least two members disposed in parallel, and first and second connections structured and arranged at respective ends to connect the at least two members together.

In embodiments, the first and second connections can have an arcuate shape. Further, the arcuate shapes may be one of: arranged in non-parallel planes; and arranged in parallel planes.

Embodiments of the invention are directed to a method for one of engaging and disengaging an insertion tube from a coupling element of a fluid line. The coupling element has an unlocking device that is linearly movable parallel to the insertion tube. The method includes pulling the unlocking element relative to the coupling element in a direction away from an insertion tube receptacle, whereby projections on the unlocking element depress unlocking levers of a snap-in locking device to lift locking elements of the snap-in locking device; and moving at least one of the coupling element and the insertion tube relative to each other while the locking elements are lifted.

According to embodiments of the invention, for engaging, while the locking elements are lifted, the method can include relatively moving at least one of the coupling element and insertion tube toward each other until the insertion tube is seated in the coupling element, and pushing the unlocking element toward the insertion tube receptacle, whereby the locking elements engage the insertion tube.

In accordance with still yet other embodiments of the present invention, for disengaging, when the unlocking element is pulled relative to the insertion tube receptacle, the locking elements are lifted from engagement with the insertion tube, and while the locking elements are lifted from engagement with the insertion tube, relatively moving at least one of the coupling element and insertion tube away from each other until the insertion tube is removed from the coupling element.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows an unlocking element of a first embodiment;

FIG. 2 shows an unlocking element of a second embodiment;

FIG. 3 shows a coupling element having an unlocking element of the first embodiment;

FIG. 4 shows a coupling element having an unlocking element of the second embodiment;

DETAILED DESCRIPTION OF THE EMBODIMENTS

Figure 5:
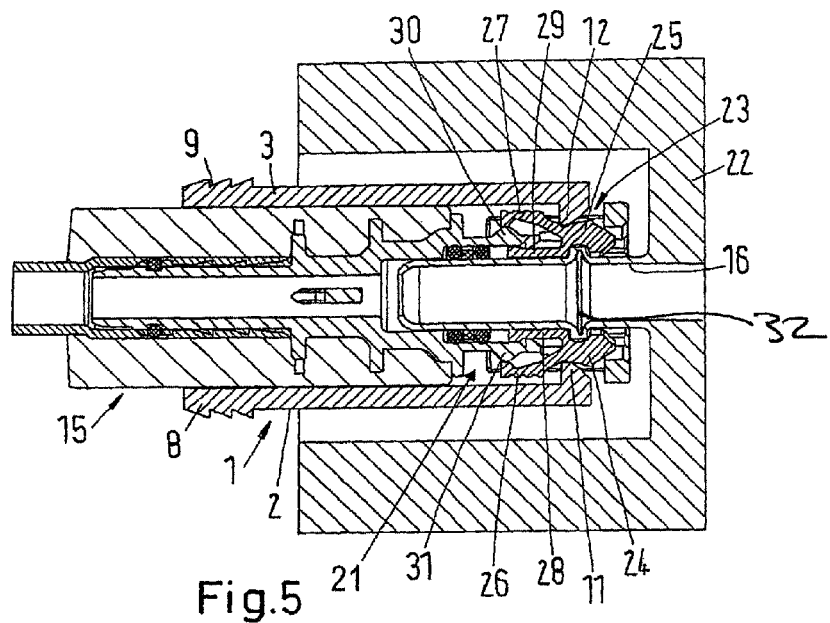
FIG. 5 shows a cross-sectional view of the coupling element in the locked state.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows an unlocking element 1 of a first embodiment. The unlocking element 1 has two members 2, 3 disposed parallel to each another and which are connected to each another at first ends 5, 6 thereof via a first connection 4 and at their second ends 8, 9 via a second connection 7. The first connection 4 and the second connection 7 are designed as curved and are disposed on an upper side of the members 2, 3.

In this manner, the first connection 4 and the second connection 7 run parallel to each other.

The first connection 4 forms a rectangle with the second connection 7 and the members 2, 3. An actuation handle 10 disposed in the middle of the second connection 7 is arranged to extend in a direction facing away from the first connection 4.

Projections 11, 12 are designed at the ends 5, 6 to be directed inward and thus at each other. Each projection 11, 12 has an effective surface 13, 14 is located on a radial inner side of the projections. The effective surfaces 13, 14 can transition into inclined stopping areas in order to keep actuating forces low.

FIG. 2 presents an unlocking element 1' according to a second embodiment which differs from the embodiment according to FIG. 1' only in the arrangement of the second connection 7'. Accordingly, elements that correspond with each other are therefore provided with the same reference signs. In the embodiment according to FIG. 2, the second connection 7' runs in a plane with the members 2, 3.

A configuration of this type is particularly beneficial for coupling elements that are designed as 90° angled pieces, e.g., as depicted in FIG. 4.

The members 2, 3 can be produced from a plastic as one piece with the first connection 4, the second connection 7 (or 7'), and the actuation handle 10. It is also conceivable to connect several parts with one another, for example, by welding.

The unlocking element 1 (or 1') is provided with a serrated surface at the ends 8, 9 and at the handle 10. This serves to simplify an actuation in damp environments or for example with gloves.

FIG. 3 shows the unlocking element of the first embodiment, i.e., as shown in FIG. 1, in connection with a coupling element 15. The coupling element 15 serves to fluid-tightly connect a nozzle-shaped insertion element 16 to a fluid line 17. Instead of a nozzle-shaped insertion element 16, a further fluid line can also be provided for connection. In this instance, it is advantageous when the fluid line includes, preferably as one piece, the insertion element 16.

The members 2, 3 of the unlocking element 1 are disposed laterally on a housing 18 of the coupling element 15 in such a way that they can be linearly displaced. Projections 19, 20 are provided on the housing 18 to act as guides for members 2, 3. It is noted that only projection 19 is seen in FIG. 3, but both projections 19 and 20 are depicted in FIG. 4.

The unlocking element 1 has, between the members 2, 3, the first connection 4 and the second connection 7, an open space through which a part of the housing 18 of the coupling element 15 extends. An arrangement of the unlocking element 1 at the coupling element 15 that is very space saving results from the shape of the connections 4, 7 which is adapted to a curve or contour of the housing 18.

FIG. 4 shows an embodiment of the coupling element 15, in which the fluid line 17 and the insertion element 16 are not disposed aligned with each other, but are rather perpendicular to each other. Consequently, the coupling element 15 is designed to extend in a 90° angle. With regard to an embodiment of the coupling element 15 of this type, the second embodiment of the unlocking element 1, as shown in FIG. 2, is used. The connections 4, 7 of the unlocking element 1 are also thereby designed parallel to the (e.g., contours of) housing 18 such that an installation space saving arrangement is possible. In the two embodiments, as well as in the embodiment according to FIG. 3 and also the embodiment according to FIG. 4, the unlocking element 1 can be displaced linearly parallel to an axial direction of the insertion element 16. The insertion element 16 is inserted in a receptacle region 21 (see FIGS. 5 and 6) which is formed in the housing 18 of the coupling element 15.

FIG. 5 shows a cross-sectional view of the coupling element 15 according to FIG. 3, wherein the coupling element 15 is connected to a insertion element 16 that is designed as one piece with a housing wall 22, for example of a fuel tank.

As can be observed, only relatively little room is available for the coupling element 15.

The coupling element 15 has a snap-in locking device 23 which comprises two locking elements 24, 25. The locking elements 24, 25 are designed as one piece with the unlocking levers 26, 27. The locking elements 24, 25 are disposed elastically pivotably at guide members 28, 29, and are designed as one piece with the guide members 28, 29 and the unlocking levers 26, 27.

A part of the housing 18 of the coupling element 15 extends between the unlocking levers 26, 27 and the guide members 28, 29. This part has raised points 30, 31 which are disposed under the unlocking levers 26, 27 at the position shown on the locking elements 24, 25, and thus prevent compression of the unlocking levers 26, 27.

The locking elements 24, 25 are snapped onto a circumferential flange 32 of the insertion element 16. The unlocking element 1 is displaced relatively far in the direction of the insertion element 16, such that the projections 11, 12 are located in front of projections or raised points 30, 31 that are located in the initial region of the unlocking levers 26, 27. In this way, it is possible to exert an axial tractive force on the locking elements 24, 25 via the unlocking element 1 such that the coupling element 15 can be pushed in the direction of the insertion element 16 while the locking elements 24, 25, with the assistance of the unlocking element 1, are pulled in the opposite direction. In this way, a movement of the unlocking levers 26, 27 is not further blocked by the raised points 30, 31. The locking elements 24, 25 are then located in their unengaged position, as is shown in FIG. 6.

Figure 6:
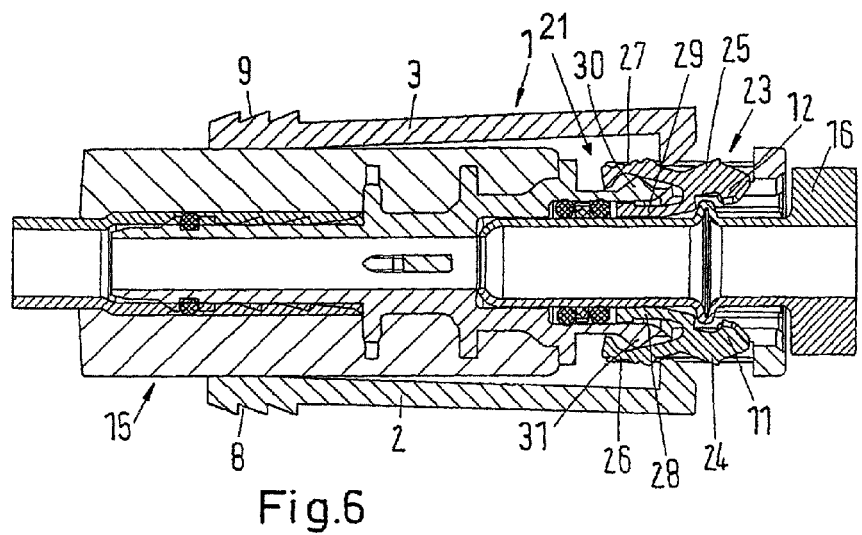
FIG. 6 shows a cross-sectional view of the coupling element in the opened state.

In FIG. 6, the unlocking element 1 is yet further axially displaced in a position such that the effective surfaces 13, 14 of the unlocking element 1 interact with the unlocking levers 26, 27 in such a way that the unlocking levers 26, 27 are pushed radially towards each other. Due to the elastic design of the guide members 28, 29 as well as the elastic connection thereof to the locking elements 24, 25, a pivoting movement and thus a radial removal of the locking elements 24, 25 away from each other results from the radial compression of the unlocking levers 26, 27. The snap-in locking device 23 is thus loosened such that the insertion element 16 can be removed.

As long as the unlocking element 1 is located in the position shown in FIG. 6, a renewed insertion of the insertion element 16 is possible without problem. To catch, the unlocking element 1 must only be displaced in the direction of the insertion element 16. The unlocking element 1 enables a relatively simple actuation of the unlocking levers 26, 27 without requiring a direct manual grasp at the unlocking levers 26, 27.

In this way, a simplified unlocking of the snap-in locking device 23 of the coupling element 15 occurs and thus a simplified disassembly.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A coupling element for a fluid line comprising:
    a housing having a receptacle region structured and arranged to receive an insertion element;
    a snap-in locking device in the receptacle region that is structured and arranged for a locking connection with the insertion element;
    the snap-in locking device including at least one locking element having an unlocking lever, the unlocking lever being structured as one piece with the at least one locking element;
    an unlocking element being axially movable between a first position, in which the unlocking element interacts with the unlocking lever, and a second position, in which the unlocking element releases the unlocking lever;
    raised points located on the housing radially below the unlocking lever and axially movable between a blocked position, in which a movement of the unlocking lever is blocked, and an unengaged position, in which the unlocking lever is actuatable; and
    the unlocking element is movable relative to the raised points in such a manner that to apply a traction force on the unlocking element, the raised points are moved from the blocking position into the unengaged position.

2. The coupling element according to claim 1, wherein the snap-in locking device has at least two locking elements that are disposed on a circular path, the at least two locking elements being movable radially outward by pressing the unlocking lever radially inward.

3. The coupling element according to claim 2, wherein the unlocking element has a number of members, corresponding to a number of locking elements, which are disposed in parallel and have effective surfaces.

4. The coupling element according to claim 3, wherein the effective surfaces are disposed on projections directed radially inward that are located at ends of the members.

5. The coupling element according to claim 4, wherein a first connection couples the ends of the members with the projections to each other.

6. The coupling element according to claim 5, wherein the first connection has an arched shape with a curve corresponding to a curve of the housing in the receptacle region.

7. The coupling element according to claim 5, wherein a second connection couples the members to each other at second ends of the members opposite the ends with the projections.

8. The coupling element according to claim 7, wherein the second connection runs parallel to the first connection.

9. The coupling element according to claim 7, wherein the second connection runs in a plane with the members and has a curve that is directed away from the ends with the projections.

10. The coupling element according to claim 4, wherein, by increasing the traction force, the projections of the unlocking element slide over the projections of the locking elements so that the effective surfaces interact with the unlocking levers.

11. The coupling element according to claim 1, wherein the raised points are movable into the blocked position by pulling on the insertion element after the unlocking element is moved to the second position.

12. An unlocking element to unlock a snap-in locking device of the coupling element according to claim 1, the unlocking element comprising:
    at least two members disposed in parallel; and
    first and second connections structured and arranged at respective ends of the at least two members to connect the at least two members together.

13. The unlocking element according to claim 12, wherein the first and second connections have an arcuate shape.

14. The unlocking element according to claim 13, wherein the arcuate shapes are one of:
    arranged in non-parallel planes; and
    arranged in parallel planes.

15. The coupling element according to claim 1, wherein the unlocking element is movable from the second position to the first position under the traction force.

16. The coupling element according to claim 1, wherein a direction of the traction force is opposite a direction of movement from the blocking position to the unengaged position.

17. A method for one of engaging and disengaging an insertion tube to/from a coupling element of a fluid line, the coupling element having an unlocking element linearly movable parallel to the insertion tube, the method comprising:
    axially pulling the unlocking element relative to the coupling element in a direction away from an insertion tube receptacle, whereby projections on the unlocking element depress unlocking levers of a snap-in locking device to lift locking elements of the snap-in locking device; and
    moving at least one of the coupling element and the insertion tube relative to each other while the locking elements are lifted,
    wherein the coupling element includes raised points positionable to block movement of the locking levers, and the method further comprises axially pushing the raised points, which are located in blocking positions directly radially below the unlocking levers, to an unengaged position that is radially but not directly below the unlocking levers.

18. The method according to claim 17, wherein, for engaging, while the locking elements are lifted, relatively moving at least one of the coupling element and insertion tube toward each other until the insertion tube is seated in the coupling element; and
    pushing the unlocking element toward the insertion tube receptacle, whereby the locking elements engage the insertion tube.

19. The method according to claim 17, wherein, for disengaging, when the unlocking element is pulled relative to the insertion tube receptacle, the locking elements are lifted from engagement with the insertion tube; and
    while the locking elements are lifted from engagement with the insertion tube, relatively moving at least one of the coupling element and insertion tube away from each other until the insertion tube is removed from the coupling element.

* * * * *